US009317863B2

(12) United States Patent
Kissinger et al.

(10) Patent No.: US 9,317,863 B2
(45) Date of Patent: Apr. 19, 2016

(54) MEDIA CONTENT SELECTION AND PRESENTATION CONTROL

(75) Inventors: Matthew R. Kissinger, Harrisburg, PA (US); Michael J. Andri, Portland, OR (US)

(73) Assignee: TAMIRAS PER PTE. LTD., LLC, Dover, DE (US)

( * ) Notice: Subject to any disclaimer, the term of this patent is extended or adjusted under 35 U.S.C. 154(b) by 580 days.

(21) Appl. No.: 13/549,519

(22) Filed: Jul. 16, 2012

(65) Prior Publication Data
US 2012/0278875 A1    Nov. 1, 2012

Related U.S. Application Data

(63) Continuation of application No. 12/471,459, filed on May 25, 2009, now Pat. No. 8,224,929.

(51) Int. Cl.
| | |
|---|---|
| *G06F 15/16* | (2006.01) |
| *G06Q 30/02* | (2012.01) |
| *H04W 8/18* | (2009.01) |
| *H04W 88/00* | (2009.01) |
| *H04L 29/08* | (2006.01) |

(Continued)

(52) U.S. Cl.
CPC ............... *G06Q 30/02* (2013.01); *H04L 67/10* (2013.01); *H04L 67/306* (2013.01); *H04L 67/327* (2013.01); *H04W 4/02* (2013.01); *H04W 8/18* (2013.01); *H04W 8/20* (2013.01); *H04W 74/06* (2013.01); *H04W 88/00* (2013.01)

(58) Field of Classification Search
CPC ......... G06Q 30/02; H04W 8/20; H04W 8/18; H04W 88/00; H04W 4/02; H04W 74/06; H04L 67/303; H04L 67/306; H04L 67/327; H04L 67/10; G06F 17/30035; G06F 17/30899
USPC ........ 709/204, 224, 219; 707/1, 104.1; 705/7, 705/10; 701/206; 455/456.1, 574, 432.3, 455/456.3; 370/346

See application file for complete search history.

(56) References Cited

U.S. PATENT DOCUMENTS

| | | | |
|---|---|---|---|
| 6,947,966 | B1 | 9/2005 | Oko, Jr. |
| 7,478,052 | B2 | 1/2009 | Ueda |

(Continued)

OTHER PUBLICATIONS

Anil S. Menon et al.; "Audience Response Made Easy: Using Personal Digital Assistants as a Classroom Polling Tool", http://jamia.bmj.com/content/11/3/217.short; 2004; 5 pages.

(Continued)

*Primary Examiner* — Jungwon Chang
(74) *Attorney, Agent, or Firm* — Schwabe, Williamson & Wyatt, PC

(57) ABSTRACT

An identifier is received from each participant mobile device of a plurality of participant mobile devices within a participation region of a wireless network via a wireless access point. One or more attributes for each participant mobile device are retrieved based upon the identifier received from that participant mobile device. The one or more attributes indicate one or more media content items stored at that participant mobile device or previously accessed via that participant mobile device. An indication of the one or more attributes for each participant mobile device is output. Media content is selected based on the one or more attributes indicated for each participant mobile device. The media content is presented, for example, within the participation region.

21 Claims, 9 Drawing Sheets

(51) Int. Cl.
*H04W 4/02* (2009.01)
*H04W 74/06* (2009.01)
*H04W 8/20* (2009.01)

(56) References Cited

U.S. PATENT DOCUMENTS

| | | | |
|---|---|---|---|
| 8,077,628 B2 | 12/2011 | Giles | |
| 8,260,852 B1* | 9/2012 | Cselle | 709/204 |
| 2002/0049727 A1* | 4/2002 | Rothkopf | 707/1 |
| 2004/0204983 A1* | 10/2004 | Shen et al. | 705/10 |
| 2007/0019795 A1 | 1/2007 | Thomas | |
| 2007/0100938 A1 | 5/2007 | Bagley | |
| 2007/0112762 A1 | 5/2007 | Brubaker | |
| 2007/0192785 A1 | 8/2007 | Pellinat | |
| 2008/0021851 A1 | 1/2008 | Alcalde | |
| 2008/0195664 A1* | 8/2008 | Maharajh et al. | 707/104.1 |
| 2008/0242370 A1* | 10/2008 | Lando et al. | 455/574 |
| 2008/0313010 A1* | 12/2008 | Jepson et al. | 705/10 |
| 2009/0012925 A1 | 1/2009 | Brown | |
| 2009/0019502 A1 | 1/2009 | Liu | |
| 2009/0049097 A1 | 2/2009 | Nocifera | |
| 2009/0063252 A1* | 3/2009 | Abhyanker | 705/10 |
| 2009/0119693 A1 | 5/2009 | Higgins | |
| 2009/0169178 A1 | 7/2009 | Higgins | |
| 2009/0307033 A1* | 12/2009 | Pais et al. | 705/7 |
| 2010/0076677 A1* | 3/2010 | Bussmann et al. | 701/206 |
| 2010/0228592 A1 | 9/2010 | Anderson | |
| 2010/0251280 A1 | 9/2010 | Sofos | |

OTHER PUBLICATIONS

Rescigno A.A., "Optimal Polling in Communication Networks", http://ieeexplore.ieee.org/xpl/articleDetails.jsp?arnumber=346163; Oct. 29, 1994; 8 pages.

Dongsong Zhang, et al.; "Personalized Content Delivery to Mobile Devices", http://ieeexplore.ieee.org/xpl/articleDetails.jsp?arnumber=1244264; Oct. 8, 2003; 6 pages.

Wikipedia, "Last.fm", May 24, 2009, http://en.wikipedia.org/wiki/Last_fm; 16 pages.

Wikipedia, "Bill Gates' House", May 24, 2009, http://en.wikipedia.org/wiki/Bill_Gates_House; 2 pages.

* cited by examiner

SETTINGS FOR DEFINING PARTICIPATION REGION — 600

620

PROXIMITY THRESHOLD

SIGNAL STRENGTH

DEFAULT: [████████████████████████]
USER PREFERENCE: [██████████████████     ]
0         70    100

GEOGRAPHIC COORDINATES: [      ] LONG.  [      ] LAT.
IP ADDRESSES: [                    ]

650

SETTINGS FOR DEFINING PARTICIPANTS

PARTICIPANT THRESHOLD

DEFAULT:         [ 0 ] MIN    [ ALL ] MAX

USER PREFERENCE: [ 5 ] MIN    [ 20 ] MAX

640

SETTINGS FOR DEFINING POLLING CATEGORIES

POLLING CATEGORIES

CONTENT: ☑ AUDIO  ☑ VISUAL  ☐ TEXTUAL  ☐ PREFERENTIAL

SOURCE:  ☐ USER CREATED   ☑ COMMERCIALLY AVAILABLE

PROVIDER: ☑ PROVIDER A  ☐ PROVIDER B  ☐ PROVIDER C

630

SETTINGS FOR ATTRIBUTES OF MEDIA CONTENT ITEMS TO BE RETURNED

☑ AUTHOR  ☐ CONTENT NAME  ☑ VOLUME DATA  ☐ USER RATING
☐ PLAY COUNT  ☐ DATE LAST PLAYED  ☐ FILE FORMAT  ☐ DURATION

660

AUTHENTICATION PREFERENCE

AUTHENTICATION: ☑ ON   ☐ OFF

610

MEDIA CONTENT FILTER

FILTER: ☑ EXPLICIT CONTENT  ☐ CONTENT LESS THAN 4 STARS

SETTINGS FOR DEFINING PARTICIPATION PREFERENCE

PERMISSIONS FOR POLLING CATEGORIES

GLOBAL: ☑ ON  ☐ OFF

CONTENT: ☑ AUDIO  ☑ VISUAL  ☐ TEXTUAL  ☐ PREFERENTIAL

SOURCE: ☐ USER CREATED  ☑ COMMERCIALLY AVAILABLE

PROVIDER: ☑ PROVIDER A  ☐ PROVIDER B  ☐ PROVIDER C

ATTRIBUTES: ☑ AUTHOR  ☐ CONTENT NAME  ☐ VOLUME DATA

820

AUTHENTICATION PREFERENCE

AUTHENTICATION: ☑ ON  ☐ OFF

USERNAME: USER1

PASSCODE: *******

FIG. 8

```
MOBILE DEVICE POLLING EVENT: 33
PARTICIPATION REGION: 2 OF 3
    PARTICIPANT MOBILE DEVICE: 1
        AUDIO CONTENT
            AUTHORS
                BEETHOVEN: 19 MEDIA CONTENT ITEMS
                RADIOHEAD: 15 MEDIA CONTENT ITEMS
                PINK FLOYD: 7 MEDIA CONTENT ITEMS
                THE MISFITS: 3 MEDIA CONTENT ITEMS
            GENRES
                ROCK: 22 MEDIA CONTENT ITEMS
                CLASSICAL: 19 MEDIA CONTENT ITEMS
                PUNK: 3 MEDIA CONTENT ITEMS
            VOLUME DATA
                MAXIMUM: 99 / 100
                MINIMUM: 67 / 100
                1 STD. DEV. RANGE: 75 – 85 / 100
    PARTICIPANT MOBILE DEVICE: 2
        AUDIO CONTENT
            AUTHORS
                LED ZEPPELIN: 56 MEDIA CONTENT ITEMS
                RADIOHEAD: 33 MEDIA CONTENT ITEMS
                GRATEFUL DEAD: 16 MEDIA CONTENT ITEMS
            GENRES
                ROCK: 89 MEDIA CONTENT ITEMS
                JAM: 16 MEDIA CONTENT ITEMS
            VOLUME DATA
                MAXIMUM: 70 / 100
                MINIMUM: 33 / 100
                1 STD. DEV. RANGE: 40 – 52 / 100
    PARTICIPANT MOBILE DEVICE: 3
        AUDIO CONTENT
            AUTHORS
                RADIOHEAD: 55 MEDIA CONTENT ITEMS
            GENRES
                ROCK: 55 MEDIA CONTENT ITEMS
            VOLUME DATA
                MAXIMUM: 100 / 100
                MINIMUM: 90 / 100
                1 STD. DEV. RANGE: 95 – 98 / 100
```

FIG. 10

MEDIA CONTENT SELECTION AND PRESENTATION CONTROL

PRIORITY CLAIM

The present application claims priority to and is a continuation of non-provisional patent application Ser. No. 12/471,459, to be issued as U.S. Pat. No. 8,224,929 on Jul. 17, 2012, titled MOBILE DEVICE POLLING FOR MEDIA CONTENT SELECTION AND PRESENTATION CONTROL, filed May 25, 2009, the entire contents of which are incorporated herein by reference in their entirety for all purposes.

BACKGROUND

Mobile computing devices ("mobile devices") enable users to access media content such as audio and visual content without necessarily confining the user to a particular location. Hence, mobile device users are free to carry their mobile devices with them as they go about their daily lives, enabling users to consume media content at a variety of different locations. Wireless communications further increase flexibility by enabling mobile device users to obtain new media content from nearly any location via a wireless network.

SUMMARY

In addition to the mobile device as a portal for accessing media content, mobile device users may be exposed to media content from other sources. Retail establishments such as grocery stores and shopping malls, for example, may provide music to its customers. Transportation systems such as airports and train stations may present television content to travelers. Furthermore, in the context of private homes and apartments, hosts may present media content for the benefit of themselves and their guests.

Yet, people have vastly differing media content preferences. Hence, it is challenging to select media content that will appeal to a group of people at a particular location. Querying each person of a group for their preferences may be useful for selecting media content, but such querying may be cost prohibitive, inaccurate, or inconvenient. Further still, preferences may change over time, eventually making the query results inaccurate or defunct.

Accordingly, embodiments relating to mobile device polling are disclosed. In one embodiment, a content polling system of a computing network is disclosed. The content polling system includes a content polling module that is configured to facilitate mobile device polling.

The content polling module is configured to identify a set of two or more participant mobile devices within a participation region of a wireless network and transmit a content polling request to each participant mobile device of the set of two or more participant mobile devices via the wireless network. In at least some embodiments, the content polling request is executable by each participant mobile device to return a content polling response to the content polling module.

The content polling module is further configured to receive the content polling response from each participant mobile device via the wireless network. The content polling response received from each participant mobile device indicates an attribute of one or more media content items stored at that participant mobile device or one or more media content items previously accessed via that participant mobile device. The content polling module is further configured to transmit a content selection request to a content selection module.

The content selection request indicates the attributes of the content polling responses received from the set of two or more participant mobile devices. The content selection request is executable by the content selection module to return a content selection response indicating selected media content that was selected by the content selection module based on or responsive to the attributes indicated by the content selection request.

In at least some embodiments, the content polling module is further configured to receive the content selection response indicating the selected media content from the content selection module and transmit a content performance request to a media player module, the content performance request indicating the selected media content. The content performance request is executable by the media player module to perform the selected media content. In this way, the selection of media content for presentation to a group of people may be driven by media content that resides at or was previously accessed via participant mobile devices carried by members of the group.

BRIEF DESCRIPTION OF DRAWINGS

FIG. 6 is a schematic diagram depicting an example graphical user interface for managing participation in a mobile device polling environment.

FIG. 8 is a schematic diagram depicting an example graphical user interface for managing participation in a mobile device polling environment.

FIG. 10 depicts a non-limiting example of the polling data that may be provided by the content polling module to the content selection module via a content selection request.

DETAILED DESCRIPTION

As disclosed herein, mobile devices may be polled through an automated or semi-automated process referred to as "mobile device polling". Mobile device polling may be used to acquire polling data from a mobile device in an automated or semi-automated manner without necessarily requiring user input at the mobile device. The polling data that is received from a mobile device may indicate attributes of media content stored on the mobile device and/or previously accessed via the mobile device. This media content may include one or more of audio content such as music, audio books, and podcasts; visual content such as video and static images; textual content such as digital books, webpages, or newspapers; and preferential content such as user indicated favorites, and bookmarks. The term "mobile device" as used herein may refer to a generally portable computing device such as a notebook computer, a laptop computer, a personal digital assistant (PDA), a mobile phone, a mobile media player, or other suitable mobile computing device.

Having acquired this polling data from the participant mobile devices, presentation media content may be selected based on or in response to the acquired polling data. The presentation media content ("selected media content") may be presented to or performed for the benefit persons that typically include the users of participant mobile devices via a public or common media output device such as a graphical display, a stereo system, etc. Furthermore, presentation of the selected media content may be controlled responsive to attributes indicated by the polling data. For example, volume settings of participant mobile devices that are set by their respective users when accessing media content that includes audio output may be recorded at each mobile device and acquired as polling data that may be used to inform the volume at which the selected media content is performed.

Figure 1:
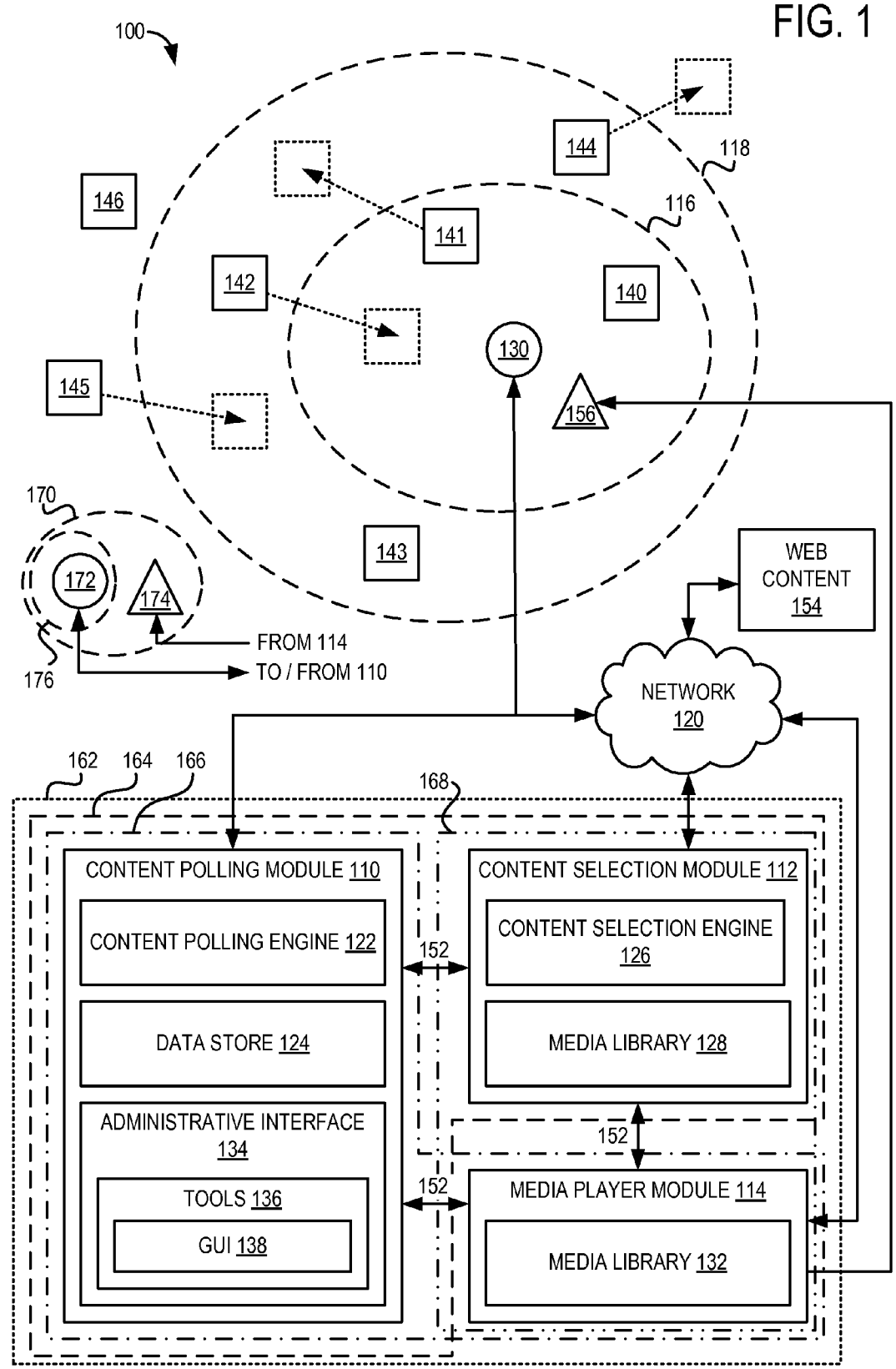
FIG. 1 is a schematic diagram depicting an example content polling system.

FIG. 1 is a schematic diagram depicting an example content polling system 100 of a computing network. Content polling system 100 may include one or more of a content polling module 110, a content selection module 112, and a media player module 114, each of which may be embodied as a program or a component of a program configured to operate on a computing device. Hence, each of content polling module 110, content selection module 112, and media player module 114 may be embodied as instructions held on computer readable media executable by a processor of a computing device.

Content polling system 100 may further include one or more wireless access points, such as wireless access point 130. Wireless access point 130 may include a wireless router or other suitable device for facilitating wireless communication (e.g., depicted as wireless network 118) between content polling module 110 and one or more mobile devices. Content polling module 110 may be configured to identify a set of two or more participant mobile devices within a participation region 116 of a wireless network 118. In the example embodiment of FIG. 1, wireless network 118 is provided by a wireless access point 130, however it should be appreciated that a wireless network may be provided by two or more wireless access points.

In FIG. 1, mobile devices are represented schematically as blocks 140, 141, 142, 143, 144, 145, and 146. Mobile devices 140 and 141 are depicted within participation region 116, with mobile device 141 in the process of leaving participation region 116. Hence, FIG. 1 depicts an instance where there are two participant mobile devices 140 and 141 within participation region 116. Mobile devices 142, 143, and 144 are depicted outside of participation region 116 and within wireless network 118, with mobile device 142 in the process of entering participation region 116 and mobile device 144 in the process of leaving wireless network 118. Mobile devices 145 and 146 are depicted outside of wireless network 118, with mobile device 145 in the process of entering wireless network 118.

Content polling module 110 may be further configured to transmit a content polling request to each participant mobile device of the set of two or more participant mobile devices within the participation region via the wireless network. For example, content polling module 110 may transmit a content polling request to each of participant mobile devices 140 and 141 that are currently within participation region 116. The content polling request may be executable by each participant mobile device to return a content polling response to the content polling module.

As mobile devices enter participation region 116 and become new participant mobile devices, content polling module 110 may be configured to likewise transmit a content polling request to at least the new participant mobile devices. For example, mobile device 142 of FIG. 1 may be polled by content polling module 110 when mobile device 142 enters participation region 116. Conversely, when participant mobile devices leave participation region 116 and become non-participant mobile devices, the content polling module may discontinue transmitting content polling requests to the non-participant mobile devices. Furthermore, content polling module may be configured to optionally discontinue using the polling data obtained from the non-participant mobile devices for the selection of presentation media content. For example, polling data that was obtained from mobile device 141 when it was a participant mobile device may be uninfluential or less influential for selecting presentation media content.

Content polling module 110 may be configured to receive polling data as a content polling response from each participant mobile device via the wireless network provided by wireless access point 130. The content polling response that is received from each participant mobile device may indicate at least an attribute of one or more media content items stored at that participant mobile device and/or media content items previously accessed via that participant mobile device. In some embodiments, each of the one or more media content items may include audio content, visual content, textual content, or preferential content.

In some embodiments, the attribute of the one or more media content items includes metadata associated with the one or more media content items. The metadata may indicate at least one of a media content identifier (e.g., a title of the media content item, an author of the media content item, a unique identifier), a media content type (e.g., file format), a user rating associated with the media content item, a duration of the media content item, and a number of times the media content item has been accessed via the mobile device (e.g., a play count), a date that the media content item was last accessed or played by the mobile device, and a volume setting set by the user at the mobile device for the media content item, among others.

Furthermore, in some embodiments, each mobile device may be configured to index the media content items contained its media library, whereby the attribute may include an indicator that indicates the indexed media content items contained in the media library. It should be appreciated that any suitable attribute of the media content items may be transmitted to the content polling module as a content polling response. As another example, a unique identifier of each mobile device (e.g., MAC address, device identifier, etc.) may be received by the content polling module via the wireless network. The content polling module may be configured to retrieve the one or more attributes for a particular mobile device from a third party source based upon the unique identifier for that mobile device. As a non-limiting example, a mobile device may register the contents of media library with a web service (e.g., web content 154), whereby the content polling module may retrieve the attributes of the contents of the media library from the web service by transmitting the unique identifier for that mobile device.

In some embodiments, the content polling response received from each participant mobile device further indicates a plurality of attributes, where each attribute of the plurality of attributes is associated with a different media content item of the one or more media content items stored at that participant mobile device or previously accessed via that participant mobile device. For example, participant mobile device 140 may transmit at least one attributes to content polling module 110 for each media content item stored in its media library. In some embodiments, a content polling engine 122 of content polling module 110 may be configured to perform the mobile device polling methods and processes described herein. For example, polling data that is received as one or more content polling responses from participant mobile devices by content polling module 110 may be stored in data store 124 by content polling engine 122.

Content polling module 110 may be further configured to transmit a content selection request to content selection module 112. The content selection request may include the polling data or may indicate the attributes of the content polling responses received from the set of two or more participant mobile devices. In some embodiments, the content polling module is further configured to aggregate the plurality of attributes received from each participant mobile device of the set of two or more participant mobile devices before the content selection request is transmitted to the content selection module. The content selection request may indicate an aggregate of the plurality of attributes received from the set of two or more participant mobile devices. As a non-limiting example, content polling engine 122 may be configured to process the polling data before or after storing the polling data in data store 124, and before transmitting a content selection request to content selection module 112.

Content selection module 112 may be configured to receive the content selection request from content polling module 110. In some embodiments, the content selection request may be executable by content selection module 112 to select presentation media content (i.e., selected media content) responsive to or based on the attributes indicated by the content selection request. In some embodiments, the selected media content includes at least one of audio content and video content. As one example, the selected media content may include an audio advertisement or a video advertisement that is likely to appeal to the users of the participant mobile device. As another example, the selected media content may include a song or a movie that is selected from a similar category, genre, or author of the media content items stored on or previously accessed by the participant mobile devices.

The content selection request may be executable by content selection module 112 to return a content selection response to content polling module 110 that indicates the selected media content or includes the selected media content. As a non-limiting example, a content selection engine 126 of content selection module 112 may be configured to retrieve the selected media content from media library 128 for embodiments where the content selection response includes the selected media content. In embodiments where the content selection response indicates the selected media content, content selection engine 126 may utilize media library 128 to identify selected media content. Furthermore, in some embodiments, content selection module 112 may refer to media library 132 of media player module 114 for selecting media content.

Content polling module 110 may be further configured to receive the content selection response indicating or including the selected media content from content selection module 112, and transmit a content performance request to media player module 114. In some embodiments, content polling engine 122 may be configured to receive and store the content selection response in data store 124. The content performance request transmitted to media player module 114 may indicate or include the selected media content and may be executable by media player module 114 to present or perform the selected media content. Media player module 114 may be configured to retrieve the selected media content from media library 132 for embodiments where the content performance request indicates the selected media content.

Content selection module 112 may be configured to transmit a content performance request to media player module 114 directly in some embodiments. The content performance request transmitted by content selection module 112 may indicate the selected media content or may include the selected media content. The content performance request received from content selection module 112 may be executable by media player module 114 to perform the selected media content. Again, media player module 114 may be configured to retrieve the selected media content from media library 132 where the content performance request indicates the selected media content.

As mobile device polling is periodically performed of the participant mobile devices, content polling module 110 may be configured to periodically update its roster of participant mobile devices. For example, content polling engine 122 may be configured to identify participant mobile devices and store a roster of the participant mobile devices in data store 124. The roster may identify participant mobile devices based on a mobile device identifier or an IP address, etc. As a non-limiting example, content polling module 110 may be configured to periodically update the set of two or more participant mobile devices by removing a first mobile device from the set of two or more participant mobile devices in response to the first mobile device leaving the participation region, and by adding a second mobile device to the set of two or more participant mobile devices in response to the second mobile device entering the participation region.

In some embodiments, the content polling module 110 may be configured to provide an administrative interface 134 that enables an administrator to control the mobile device polling that is provided by the content polling system. Administrative interface 134 may include one or more tools 136 for defining the mobile device polling processes. In some embodiments, administrative interface 134 may be accessible via a graphical user interface presented by a graphical display of a computing device. A non-limiting example of administrative interface 134 will be described in greater detail with reference to FIG. 5.

In some embodiments, the content polling module may be further configured to identify award media content for at least one participant mobile device of the set of two or more participant mobile devices and transmit the award media content to the at least one participant mobile device. The award media content identified by content polling module 110 may differ from the one or more media content items stored on or accessed via the participant mobile device. In this way, users of participant mobile devices may receive new media content as an award for participating in mobile device polling. It should be appreciated that content polling module 110 may identify award media content in a similar way as presentation media content. For example, content polling module may transmit an award media content request to content selection module 112 that indicates the attributes received only from the participant mobile device that is to receive the award media content. The content selection module may select and return the award media content via an award media content response.

In some embodiments, content polling module 110, content selection module 112, and media player module 114 may be embodied as one or more programs configured to operate on separate or independent computing devices. Hence, content polling module 110, content selection module 112, and media player module 114 may communicate via a network 120. Network 120 may include one or more of a wide area network (e.g., the Internet), a local area network, and a personal area network.

In other embodiments, content polling module 110, content selection module 112, and media player module 114 may be one or more programs configured to operate on a common computing device 162. The interaction between these modules as a common computing device is depicted at 152. In still other embodiments, content polling module 110 and content selection module 112 may be embodied as one or more programs configured to operate on a common computing device 164, while media player module 114 may be configured to operate on a separate computing device. Hence, computing device 164 may communicate with a separate computing device hosting media player module 114 via network 120.

In other embodiments, content polling module 110 and media player module 114 may be embodied as one or more programs configured to operate on a common computing device 166, while content selection module 112 may be configure to operate on a separate computing device. Hence, computing device 166 may communicate with a separate computing device hosting content selection module 112 via network 120. In still other embodiments, content selection module 112 and media player module 114 may be embodied as one or more programs configured to operate on a common computing device 168, while content polling module 110 may be configured to operate on a separate computing device. Hence, computing device 168 may communicate with a separate computing device hosting content polling module 110 via network 120.

In some embodiments, one or more of content polling module 110, content selection module 112, and media player module 114 may be provided between wireless access point 130 and network 120. Hence, it should be appreciated that network 120 may be omitted in some embodiments. Wireless access point 130 may be configured to facilitate two-way communication with mobile devices within wireless network 118 via any suitable wireless communication protocol, including one or more of radio communication, optical communication, infrared communication, and microwave communication, among others. For example, wireless network 118 may utilize one or more of Bluetooth, Wi-Fi, PCS, GSM, or other suitable wireless communication protocols via wireless access point 130. As a non-limiting example, wireless access point 130 may comprise a wireless router including a transceiver for transmitting and receiving wireless communications with mobile devices and forwarding those wireless communications to other computing devices including those hosting content polling module 110, content selection module 112, and media player module 114. It should be appreciated that the present disclosure is not limited to any particular wireless communication protocol. In some embodiments, mobile devices within wireless network 118 may additionally communicate with web content 154 (e.g., a website) via wireless access point 130 in addition to content polling module 110.

Media player module 114 may be configured to present or perform the selected media content via one or more media output devices. An example media output device 156 is depicted within participation region 116 in FIG. 1. Media output device 156 may include one or more of an audio system (e.g., audio speaker, audio amplifier, etc.) and a graphical display (e.g., monitor, television, projector, graphical sign, etc.) that are configured to present or perform (e.g., output) the selected media content). For example, where media output device 156 includes an audio speaker, the media content that is performed via media output device 156 may include audio content (e.g., music or an audio advertisement). As another example, where media output device 156 includes a graphical display, the media content that is performed via media output device 190 may include visual content (e.g., a movie or a video advertisement). It should be appreciated that visual content may include an audio content component in some examples.

As shown in FIG. 1, media output device 156 may be physically located within a vicinity of wireless access point 130 so that persons carrying the participant mobile devices, which are polled by polling module 110, may be presented with media content that is selected based on the polling data that is obtained from their participant media devices. However, it should be appreciated that media output device 156 may be located at other locations that are outside of the participation region. As a non-limiting example, the participation region may be deployed at or near an entrance to a physical location while the media output device 156 may be deployed within the physical location, enabling the content polling system to obtain polling data from participant mobile devices as users carry their mobile devices with them into the physical location via the entrance.

FIG. 1 also shows how content polling system 100 may support two or more participation regions and wireless networks. For example, a second wireless network 170 and a second participation region 176 are depicted in FIG. 1. Second wireless network 170 is provided by a second wireless access point 172 which may communicate with at least content polling module 110. A second media output device 174 is depicted receiving presentation media content from media player module 114. Second media output device 174 is depicted outside of second participation region 176 in this particular example.

Figure 2:
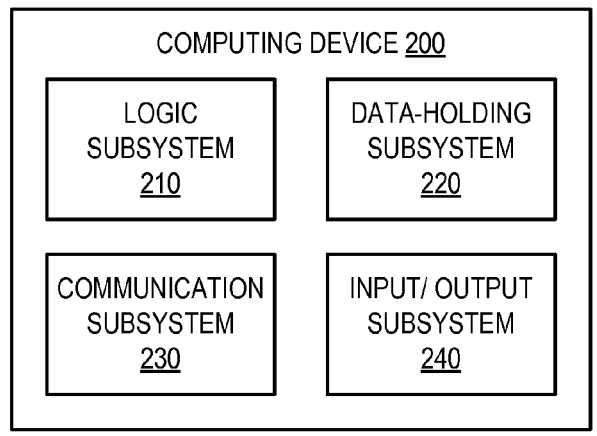
FIG. 2 is a schematic diagram depicting an example computing device.

FIG. 2 shows a schematic diagram of an example computing device 200. Computing device 200 is provided as a non-limiting example of mobile devices 140-146 and computing devices 162, 164, 166, and 168. Computing device 200 may include one or more of a logic subsystem 210, a data-holding subsystem 220, a communication subsystem 230, and an input/output subsystem 240.

Logic subsystem 210 may include one or more processors configured to execute instructions. Data-holding subsystem 220 may include any suitable type of computer-readable media and may comprise instructions stored thereon that when executed by logic subsystem 210 causes computing device 200 to perform the various functions, processes, methods, operations, and tasks described herein. As a non-limiting example, data-holding subsystem 220 may include memory, a magnetic hard drive, etc. Furthermore, instructions stored on data-holding subsystem 220 may comprise one or more of content polling module 110, content selection module 112, and media player module 114.

Communication subsystem 230 may be configured to facilitate one-way or two-way communication between computing device 200 and one or more other computing devices via a network. For example, communication subsystem 230 may include a wired or wireless communication interface configured to facilitate wireless communication by computing device on wireless network 118 of FIG. 1 or other suitable network such as network 120. Hence, communication subsystem 230 may comprise one or more of a transmitter, a receiver, a transceiver, etc. for facilitating communications with other computing devices. Input/output subsystem 240 may include one or more input devices that are configured to receive user inputs such as a keyboard, a mouse, a touchscreen, a joystick, a controller, a microphone, etc. Furthermore, input/output subsystem 240 may include one or more output devices such as an audio speaker, a graphical display, a tactile feedback device, etc.

Figure 3:
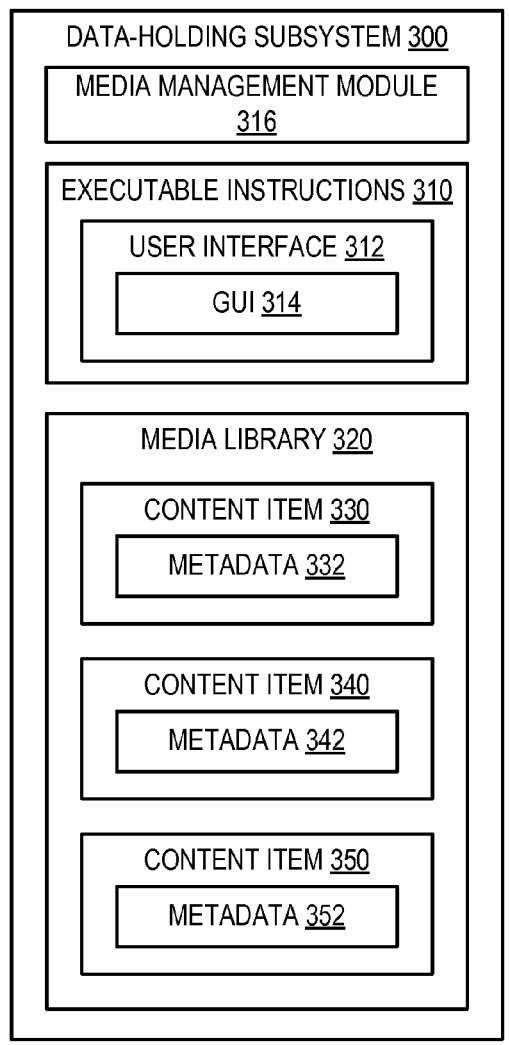
FIG. 3 is a schematic diagram depicting an example data-holding subsystem of a computing device.

FIG. 3 shows a schematic diagram depicting example data that may be stored on or held at a data-holding subsystem 300. Data-holding subsystem 300 is provided as a non-limiting example of data-holding subsystem 220 of FIG. 2. For example, data-holding subsystem may comprise a component of a mobile device such as mobile devices 140-146 of FIG. 1. Data-holding subsystem 300 may further comprise instructions 310 executable by the logic subsystem to perform one or more of the processes and methods described herein. Executable instructions 310 may include a user interface having a graphical user interface (GUI) 314 for controlling the computing device (e.g., mobile device). Executable instructions 310 may further include a media management module 316 for executing content polling requests and transmitting content polling responses to the content polling module. Executable instructions 310 will be described in greater detail with reference to the example methods and processes of FIGS. 4, 5, 7, and 9.

Data-holding subsystem 300 may further comprise a media library 320 including one or more media content items. For example, media library 320 includes three media content items 330, 340, and 350 in this particular example. The term "media content" may refer to audio content (e.g., music, audio books, webcasts, podcasts, etc.), visual content (e.g., video, movies, shows, webcasts, static images, photographs, drawings, etc.), textual content (e.g., books, webpages, documents, etc.), and preferential content (e.g., user preferences, bookmarks, favorites, etc.). Hence, each of media content items 330, 340, and 350 may represent individual media files that may be presented to the user via the mobile device. It should be appreciated that media library 320 may include any number of content items, including hundreds, thousands, or millions of content items. Further, it should be appreciated that a media library 320 may include combinations of media content items from audio, visual, textual, and preferential categories of media content.

In some embodiments, some or all of the media content items may include metadata. FIG. 3 shows each of media content items 330, 340, and 350 respectively including metadata 332, 342, and 352. The metadata of a media content item may include, describe, or indicate one or more attributes of that media content item. For example, metadata 332 may indicate at least one of a media content identifier for media content item 330, a media content type or category of media content item 330, a user rating of or user preference associated with media content item 330, and an indication of a number of times that media content item 330 was accessed by the user via at least the mobile device, a volume setting for that media content item, and other described herein.

Hence, metadata may indicate one or more attributes of the media content item with which the metadata is associated such as an author of the media content item, a date that the media content item was created, a title of the media content item, a source of the media content item, a size of the media content item, a category or type of the media content item (e.g., audio, visual, textual, or preferential), a file type of the media content (e.g., .jpg, .mp3, etc.), a number of times the media content item was accessed (e.g., played, viewed, etc.) by the user, a date that the media content item was last accessed by the user, a user rating of the mobile content item, a user commentary of the mobile content item, a volume setting or volume range of the mobile device that the user has set in response to accessing (e.g., playing) the media content item, and an indication of whether the media content item is publicly or commercial available or whether the media content item was user created. It should be appreciated that still other suitable information may be stored as metadata associated with a media content item.

As previously described with reference to FIG. 1, each participant mobile device may be configured to receive a content polling request from a content polling module (e.g., content polling module 110) via a wireless network (e.g., wireless network 118). In some embodiments, the content polling request may indicate at least a type or category of attribute to be returned to the content polling module of one or more media content items stored at or previously accessed via the participant mobile device.

As a non-limiting example, data-holding subsystem 300 may comprise instructions 310 executable by the logic subsystem to receive a user input indicating a user permission setting. For example, the user input may be received via graphical user interface 314 of user interface 312. The user permission setting may define a subset of the one or more media content items of the media library to be polled by the content polling module. Hence, each participant mobile device may be configured to receive a user input indicating a user permission setting of its respective user.

In some embodiments, data-holding subsystem 300 may further comprise instructions 310 executable by the logic subsystem to set the user permission setting to a default user permission setting prior to receiving the user input. The default user permission setting may define a default subset of the one or more media content items of the media library to be polled by the content polling module. In some embodiments, the default subset of the one or more media content items includes only public or commercially available media content items, in contrast to user created media content items whose attributes may be excluded from the polling data. For example, the mobile device may be configured to distinguish public media content items from user created media content items by referring to the metadata of each media content item. Hence, each participant mobile device may be configured to utilize a default user permission setting prior to receiving a user input.

In some embodiments, data-holding subsystem 300 may further comprise instructions 310 executable by the logic subsystem to identify one or more attributes of the subset of the one or more media content items defined by the user permission setting in response to receiving the content polling request. The one or more attributes of the subset of the one or more media content items may include metadata associated with the one or more media content items as previously described. The one or more attributes identified by the mobile device may be for the type of attribute indicated by the content polling request. Hence, each mobile device may be configured to identify attributes of media content items stored at or previously accessed by that mobile device.

In some embodiments, data-holding subsystem 300 may further comprise instructions 310 executable by the logic subsystem to transmit a content polling response to the content polling module via the wireless communication interface of the mobile device. The content polling response may indicate the one or more attributes of the type of attribute identified of the subset of the one or more media content items of the media library. In this way, the content polling module may receive a content polling response from each participant mobile device.

Figure 4:
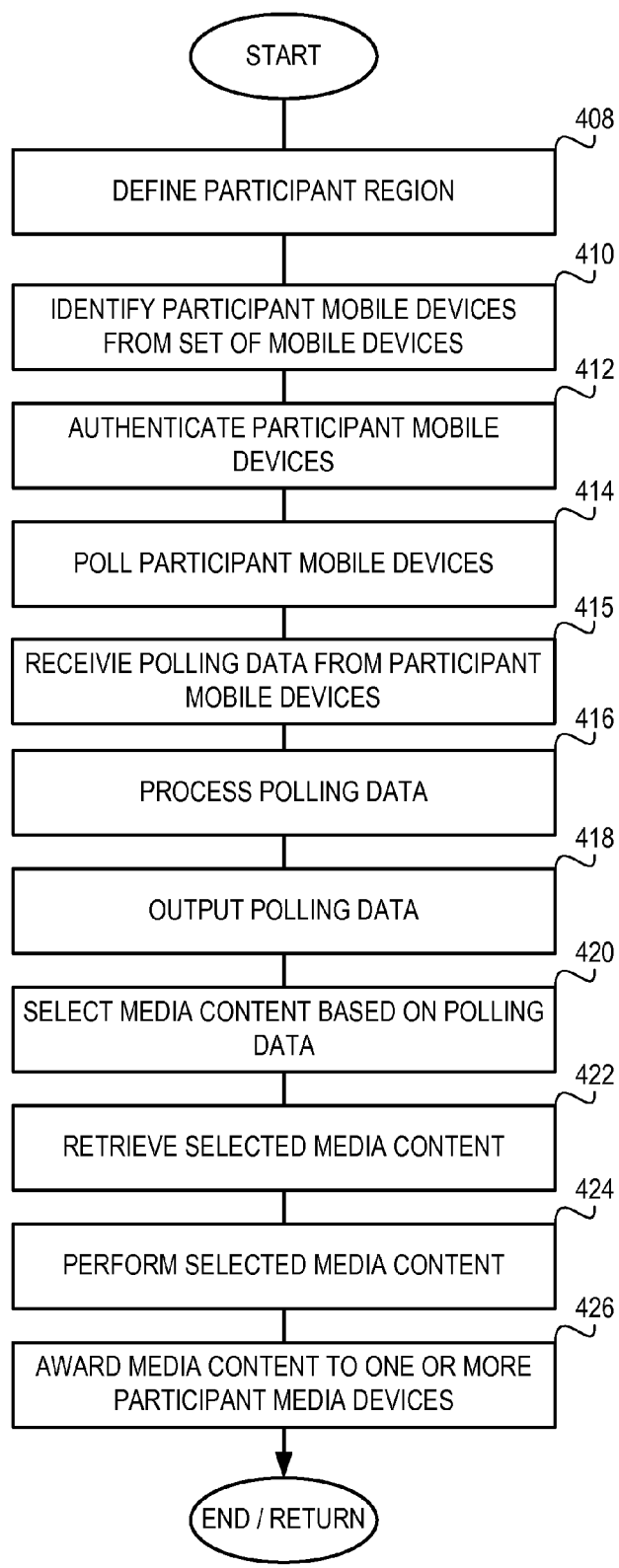
FIG. 4 is a flow chart depicting an example method of facilitating mobile device polling.

FIG. 4 shows a flow chart depicting an example method of mobile device polling in a computing network. At 408, the method may include defining a participation region. As will be described in greater detail with respect to the subsequent processes of FIG. 4, the participation region (e.g., participation region 116) may represent a region in physical space within which participant mobile devices may be polled by a content polling module (e.g., content polling module 110 of FIG. 1). By contrast, mobile devices that are outside of or external the participation region may be regarded as non-participant mobile device and may not be polled by the content polling system in some embodiments.

In at least some embodiments, the content polling module may be configured to define the participation region as the full extent of the wireless communication region (e.g., of wireless network 118). As such, the participation region may encompass all mobile devices that are within the wireless communication region of the one or more wireless access points of the content polling system.

In at least some embodiments, the content polling module may be configured to define the participation region as a sub-region of the wireless communication region. As one example, the participation region may encompass mobile devices that exhibit a threshold wireless signal strength relationship with one or more wireless access points of the content polling system, while excluding mobile devices that do not exhibit the threshold wireless signal strength relationship.

In at least some embodiments, the content polling module may be configured to define the participation region by one or more geographic coordinates that may be referenced by GPS, cellular triangulation among a plurality of wireless access points, or other geo-locating system of the mobile devices. For example, the content polling module may be configured to request a geographic location from each mobile device, whereby each mobile device may provide its respective geographic location to the content polling module. The content polling module may be configured to identify whether a particular mobile device is within the participation region by comparing the geographic coordinates defining the participation region to the geographic location of each mobile device. Hence, the participation region may be defined as a sub-region of the wireless communication region provided by the one or more wireless access points. However, it should be appreciated that the participation region need not be within the wireless network. For example, the participation region may be partially or entirely external the wireless network in some examples. As will be described in greater detail, an administrator may define the size, shape, and/or location of the participation region. Hence, the participation region may be defined by user input in some embodiments.

At 410, the method may include identifying participant mobile devices. As will be described by the subsequent processes of FIG. 5, participant mobile devices may be polled by the polling system whereas non-participant mobile devices may be optionally excluded from the poll that is conducted by the content polling system. In at least some embodiments, the participant mobile devices may be identified as a subset of all mobile devices within the wireless communication region (e.g., wireless network 118).

Where the content polling module defines the participation region by a threshold wireless signal strength, the content polling module may be configured to distinguish between participant mobile devices and non-participant mobile devices based on the wireless signal strength between the one or more wireless access points of the content polling system and each of the mobile devices within the wireless communication region. For example, a mobile device that exhibits at least the threshold signal strength with respect to a particular wireless access point may be identified as a participant mobile device, whereas a mobile device that exhibits less than the threshold signal strength with respect to the wireless access point may be identified as a non-participant mobile device.

Where the content polling module defines the participation region by one or more geographic coordinates, the polling module may be configured to distinguish between participant mobile devices and non-participant mobile devices based on the geographic location of each mobile device relative to the defined participation region in physical space. For example, a mobile device that is within the participation region defined by one or more geographic coordinates, as may be judged by GPS, wireless signal triangulation among a plurality of wireless access points, or other geo-locating protocols for the mobile device, may be identified as a participant mobile device, whereas a mobile device that is outside of the participation region defined by the one or more geographic coordinates may be identified as a non-participant mobile device.

At 412, the method may include authenticating the participant mobile devices identified at 410. Authentication may be performed between the content polling system and each participant mobile device in order to create a trusted relationship between the content polling module and the participant mobile devices. Authentication may include one-way authentication or two-way authentication between the content polling module and the participant mobile devices.

In at least some embodiments, the process of authenticating a participant mobile device may include receiving a device identifier from the participant mobile device. The content polling module may receive the device identifier from the participant mobile device via wireless communication facilitated by one or more wireless access points. In some embodiments, the content polling module may be configured to request the device identifier from the participant mobile device by transmitting an identification request to the participant mobile device via wireless communication. The participant mobile device may be configured to respond to the polling module by transmitting the device identifier to the content polling module via wireless communication. Further, in some embodiments, the content polling module and/or the participant mobile device may exchange usernames and/or passcodes that may be validated to ensure that polling data is requested from a trusted content polling module or that polling data is received from a trusted participant mobile device. Furthermore, polling data that is transmitted between participant mobile devices and the content polling module may be encrypted in some embodiments. It should be appreciate that any suitable authentication process may be utilized to secure polling data.

At 414, the method may include polling a set of two or more participant mobile devices within the participation region via the wireless network by transmitting a content polling request to each participant mobile device of the set of two or more participant mobile devices. As previously described, the content polling request may be executable by each participant mobile device to return a content polling response to the content polling module. The polling request may specify or indicate one or more polling parameters of the polling data that is to be returned by the participant polling module.

At 415, the method may include receiving polling data as a content polling response received from each participant mobile device of the set of two or more participant mobile devices. The polling data may indicate media content or attributes of media content stored on the set of two or more participant mobile devices or previously accessed by the set of two or more participant mobile devices. Hence, the polling data that is received from the participant mobile device by the polling module may include the polling data specified by the polling parameters of the polling request. These polling parameters will be described in greater detail with reference to the administrative interface of FIG. 6 and user interface of FIG. 8.

At 416, the method may include processing the polling data. In at least some embodiments, the polling module may be configured to process the polling data upon receiving the polling data from the participant mobile devices. It should be appreciated that any suitable processing of the polling data may be performed at 416. For example, the polling module may be configured to process the polling data by rearranging, repackaging, aggregating, and/or reformatting the polling data in a format that can be interpreted by the content selection module.

In some embodiments, the content polling module may be configured to aggregate the plurality of attributes received from each participant mobile device before the content selection request is transmitted to the content selection module. The content selection request may indicate an aggregate of the attributes received from the set of two or more participant mobile devices. A non-limiting example of aggregated polling data is described with reference to FIG. 10.

In some embodiments, the content polling module may be configured to process the polling data by storing or buffering the polling data (e.g., at data store 124) until a threshold amount of polling data is received from one or more of the participant mobile devices or until presentation media content is to be selected by the content selection module or until new presentation media content is to be performed by the media player module. For example, as will be described in greater detail with reference to FIG. 9, the content polling module may be configured to specify the frequency and/or timing at which selection of presentation media content is to be requested of the content selection module by the content polling module.

Hence, the content polling module may be configured to store some or all of the polling data that has been accumulated from the various participant mobile devices since the last time that polling data has been transmitted to the content selection module. In some embodiments, the polling module may be configured to discard polling data that is judged to have become stale or has exceeded a data storage threshold. For example, the polling module may be configured to judge a residence time of the polling data, and may discard the polling data if the residence time reaches a discard time. As another example, the polling module may replace less recently acquired polling data with more recently acquired polling data. For example, the content polling module may retain the polling data for a prescribed number (e.g. one or more) polling events that are conducted for the participant mobile devices. In some embodiments, the content polling module may be configured to retain all polling data at least until the polling data that is retained at the polling module can be exported or outputted for further analysis by the administrator or a data analysis provider. In some embodiments, operation 416 may be omitted. For example, the polling data that is received at the polling module may be forwarded to the content selection module without additional processing in some embodiments. Further still, in some embodiments, the content polling module may request that the participant mobile devices direct their polling data directly to the content selection module. As such, the content polling request may indicate an address at which the participant mobile devices are to transmit the content polling response, whereby the address indicates one or more content selection modules.

At 418, the method may include outputting the polling data. In at least some embodiments, the content polling module may be configured to output the polling data to the content selection module by transmitting the polling data to the content selection module as a content selection request. The polling data that is transmitted by the polling module to the content selection module may include some or all of the polling data that has been accumulated from the various participant mobile devices since the last time that the polling data has been transmitted to the content selection module. In at least some embodiments, the polling module may be configured transmit only the most recently acquired polling data to the content selection module. For example, the polling module may be configured to transmit polling data obtained from a prescribed number (e.g., one or more) of the most recently conducted polls or polling data that was obtained within a prescribed time period of the transmission of the polling data to the content selection module.

At 420, the method may include selecting presentation media content based on or responsive to the polling data. For example, the content selection module may be configured to receive the content selection request and select presentation media content based on the polling data indicated by content selection request, including attributes of the media content items stored at or accessed via the participant mobile devices.

At 422, the method may include retrieving the selected media content. For example, the content selection module may be configured to retrieve the selected media content from a media library (e.g., media library 128), whereby the content selection module transmits a content selection response indicating or including the selected media content to the content polling module or transmits a content performance request to the media player module that indicates or includes the selected media content. In some embodiments, where the content performance request merely indicates the selected media content, the media player module may be configured to retrieve the selected media content from a media library (e.g., media library 132).

At 424, the method may include performing the selected media content, for example, by presenting the presentation media content to the users of the set of two or more participant mobile devices within the participation region. As previously described, the media player module may present or perform the selected media content via one or more media output devices (e.g., media output device 156). At 426, the method may include awarding award media content to one or more participant mobile devices. For example, award media content may be transmitted to one or more of the participant mobile devices by the content selection module or may be transmitted to an account for the user of the participant mobile device where the user may later download the award media content.

In some embodiments, the content polling module is further configured to associate the attributes received from the set of two or more participant mobile devices with a polling event identifier. The content selection request transmitted to the content selection module may further indicate the polling event identifier and the content selection response received from the content selection module may further indicate the polling event identifier. In this way, the content polling module is able to identify, based on the polling event identifier, which selected media content is associated with particular attributes received from the set of two or more participant mobile devices.

In some embodiments, the participation region is one of a plurality of participation regions and the content polling module may be further configured to associate a participation region identifier with each participation region of the plurality of participation regions. The content performance request transmitted by the content polling module may further indicate the participation region identifier. In this way, the media player module may be able to direct the performance of the selected media content to the participation region indicated by the participation region identifier. Alternatively, where each participation region has its own dedicated media player module, the content polling module may be further configured to direct the content performance request to the media player module associated with the participation region indicated by the participation region identifier.

Figure 5:
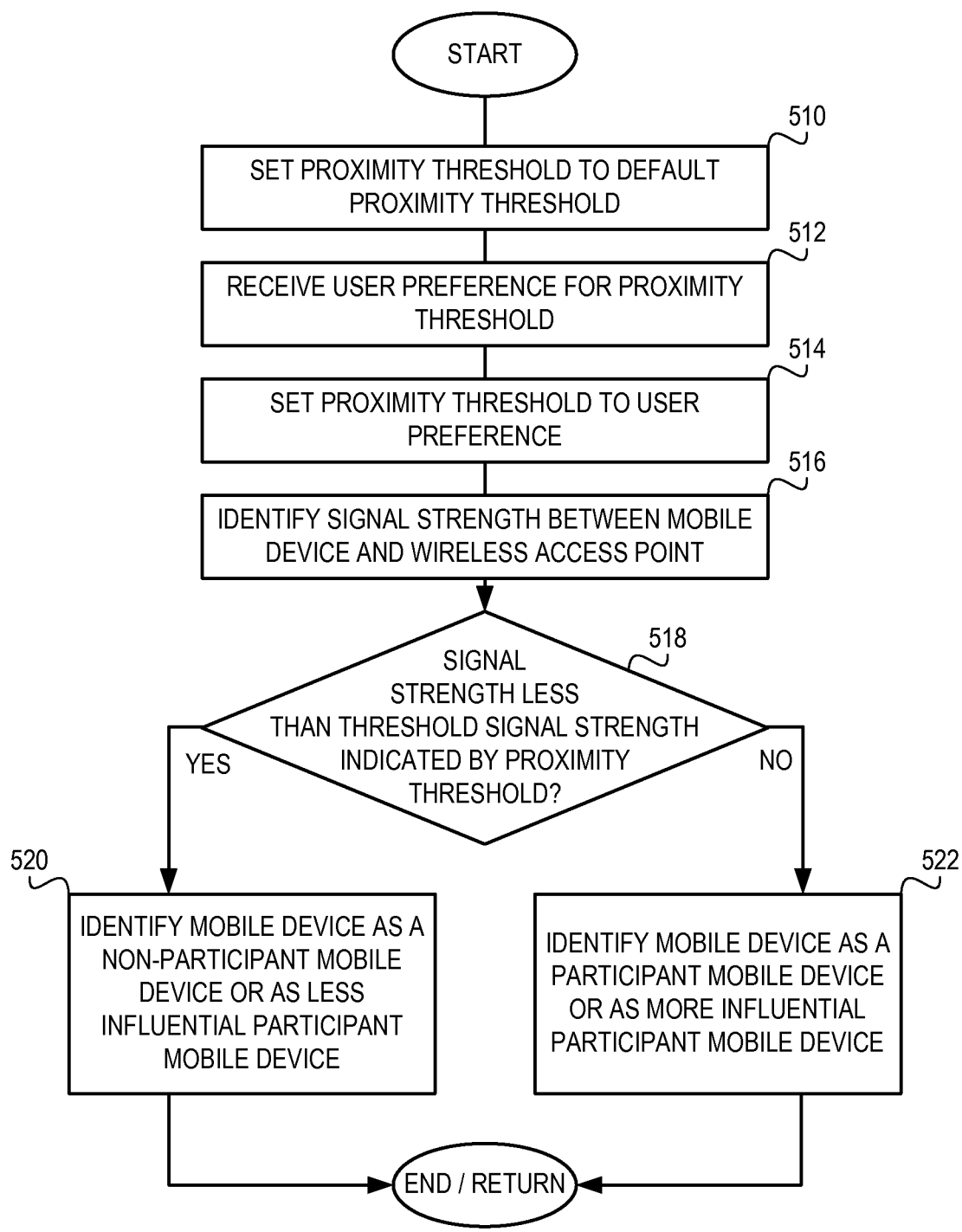
FIG. 5 is a flow chart depicting an example method of managing participation in a mobile device polling environment.

FIG. 5 shows a flow chart of an example method of managing participation in a mobile device polling environment. As a non-limiting example, the method of FIG. 5 may correspond to operation 410 of FIG. 4 which may be performed by the content polling module (e.g., content polling module 110 of FIG. 1). The method of FIG. 5 may be performed by the content polling module to enable an administrator to limit the size of the participation region to within the confines of his or her store, apartment, house, building or other physical location. In this way, the selection of performance media content may be based on only the media content items stored on or accessed by the participant mobile devices that are within the store, apartment, house, building, or other physical location.

At 510, the method may include setting a proximity threshold to a default proximity threshold. In some embodiments, the default proximity may include a maximum proximity of the wireless access point—e.g., the minimum signal strength where wireless communication can be achieved between the mobile device and the wireless access point. In other embodiments, the default may be some smaller proximity defined by a wireless signal strength that is greater than the minimum wireless signal strength for facilitating wireless communication. In this way, the content polling module may set the default proximity threshold, without requiring administrator input.

At 512, the method may include receiving a user preference for the proximity threshold. The user preference may over-ride or supersede the default proximity threshold. In some embodiments, an administrator may set a user preference that indicates a threshold wireless signal strength that is different than the threshold wireless signal strength via an administrative interface (e.g., administrative interface 134 of FIG. 1). A non-limiting example of an administrative interface is described with reference to FIG. 6.

At 514, the method may include setting the proximity threshold to the user preference. For example, the content polling module may adjust the proximity threshold from the default proximity threshold to the user preference in response to receiving the user preference (e.g., via the administrative interface).

At 516, the method may include identifying a signal strength between the mobile device and the wireless access point. In some embodiments, the content polling module may be configured to identify a one-way wireless signal strength from the mobile device to the wireless access point or from the wireless access point to the mobile device. In some embodiments, the content polling module may be configured to identify a two-way wireless signal strength between the wireless access point and the mobile device, where the content polling module may require that a threshold wireless signal strength in each direction be satisfied before identifying the mobile device as a participant mobile device.

At 518, the method may include judging whether the signal strength identified at 516 is less than a threshold wireless signal strength of the proximity threshold. For example, the content polling module may compare the threshold wireless signal strength (input by the administrator or by a default condition) to the current or time average wireless signal strength of the mobile device identified at 516.

If the answer is judged yes at 518, the process flow may proceed to 520. At 520, in some embodiments, the mobile device is identified as a non-participant mobile device and is not polled by the content polling module. In other embodiments, the mobile device is polled, but the data obtained may less influential to the content polling module or the content selection module than data obtained from mobile devices that exhibit wireless signal strengths that are equal to or exceed the wireless signal strength threshold. For example, the content polling module may be configured to indicate a wireless signal strength associated with some or all of the attributes that are provided to the content selection module via the content selection request.

Alternatively, if the answer is judged no at 518 (e.g., the wireless signal strength is greater than or equal to the threshold wireless signal strength), then the process flow may instead proceed to 522. At 522, the method may include designating the mobile device as a participant mobile device, where the content polling module may be configured to poll the participant mobile devices in accordance with the method of FIG. 4.

From 520 or 522, the process flow of FIG. 5 may return or end. For example, the content polling module may repeat the method of FIG. 5 at a prescribed or default frequency for each mobile device within the wireless network in order to update the set of participant mobile devices. The content polling module may be configured to update the set of two or more participant mobile devices by removing a first mobile device from the set of two or more participant mobile devices in response to the first mobile device leaving the participation region, and by adding a second mobile device to the set of two or more participant mobile devices in response to the second mobile device entering the participation region.

FIG. 6 shows a schematic diagram of an example graphical user interface 600 of an administrative interface for managing mobile device polling. As a non-limiting example, graphical user interface 600 may correspond to graphical user interface 138 of administrative interface 134 of content polling module 110 of FIG. 1. The content polling module may be configured to conduct mobile device polling in accordance with the definitions or preferences indicated by the administrator via the administrative interface.

In some embodiments, the administrative interface may include a media content filter tool 610 that enables an administrative user (an "administrator") to filter the selected media content before transmitting the content performance request to the media player module. For example, media content filter tool 610 may enable an administrator to remove explicit content or content having less than a prescribed user rating (e.g., four stars) from the selected media content that is indicated by or included in the content performance request that is transmitted to the media player module. In embodiments where the content performance request is transmitted directly to the media player module by the content selection module, the content selection request may indicate the filter settings of the media content filter tool, whereby the content selection module may be configured to select media content in accordance with the filter settings. For example, graphical user interface 600 includes fields or graphical selectors for receiving an administrator input for invoking different filtering settings.

In some embodiments, the administrative interface may include a participation region definition tool 620 that enables an administrative user to define at least one of a size, a shape, and a location of the participation region. The participation region definition tool may be configured to receive a participation region definition as an input from the administrative user and vary at least one of the size, the shape, and the location of the participation region responsive to the participation region definition. In some embodiments, the participation region definition comprises at least one of one or more geographic coordinates, a threshold wireless signal strength of the wireless network, and a range of internet protocol addresses for admitting a particular mobile device as a participant mobile device. For example, graphical user interface 600 includes fields or graphical selectors for receiving the geographic coordinates, threshold wireless signal, or IP addresses.

In some embodiments, the administrative interface may include an attribute definition tool 630 that enables an administrative user to define a type or category of the attributes to be returned to the content polling module from each participant mobile device. The content polling request transmitted to each participant mobile device of the set of two or more participant mobile devices may indicate the type of the attribute to be returned by the participant mobile device. For example, graphical user interface 600 may include fields or graphical selectors for enabling the administrator to select which attributes are to be returned in the polling data.

In some embodiments, the administrative interface includes a media content item definition tool 640 that enables an administrative user to define a type or category of the media content items for which the attributes are to be returned to the content polling module from the set of two or more participant mobile devices. The content polling request transmitted to each participant mobile device of the set of two or more participant mobile devices may indicate the type of media content items for which the attributes are to be returned by the participant mobile device. It should be appreciated that each of the type or categories of media content items presented in FIG. 6 may have any number of subcategories. For example, the visual content category may have selectable subcategories for television shows, movies, static images, etc.

The administrative interface may include still other tools for defining the mobile device polling environment. For example, the administrative interface may include a participant mobile device definition tool 650 for limiting the number of participant mobile devices that are polled by the content polling module. In this way, network bandwidth may be conserved by the administrator by reducing the number of participants from a default maximum setting to some lower value. As another example, the administrative interface may include an authentication preference tool 660. As shown in FIG. 6, authentication preference tool 660 enables the administrator to turn authentication on or off between the content polling module and the participant mobile devices. It should be appreciated that other authentication preferences may be provided that enable the administrator to define minimum security criteria.

Figure 7:
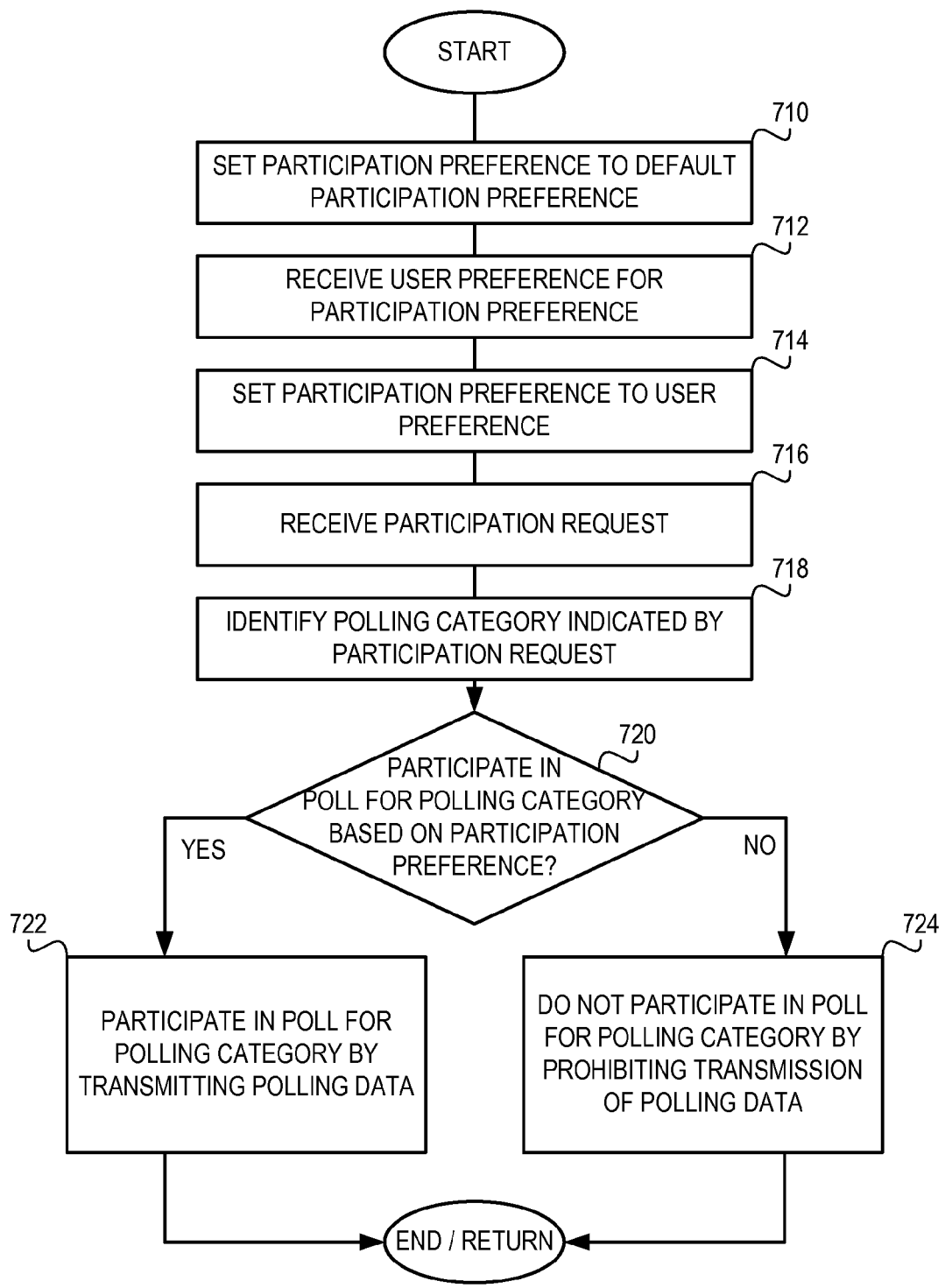
FIG. 7 is a flow chart depicting another example method of managing participation in a mobile device polling environment.

FIG. 7 is a flow chart depicting another example method of managing participation in a mobile device polling environment. The method of FIG. 7 provides an approach for a user of a mobile device to set or define user preferences for the mobile device. As such, it should be appreciate that the method of FIG. 7 may be performed by media management module 316 of the mobile device in accordance with executable instructions stored in its data-holding subsystem.

At 710, the method may include setting a participation preference to a default participation preference. For example, in some embodiments, the mobile device may default to a setting that prohibits user created media content items from being polled by the content polling module. At 712, the method may include receiving a user preference. As a non-limiting example, a user preference may be received as a user input at a user interface (e.g., user interface 312 of FIG. 3). FIG. 8 depicts an example graphical user interface 800 that may be provided as graphical user interface 314 of user interface 312. At 714, the method may include setting the participation preference to the user preference received at 712.

At 716, the method may include receiving a participation request. For example, the participant mobile device may receive a content polling request from a content polling module. At 718, the method may include identifying a polling category indicated by the participation request. For example, the media management module of the mobile device may be configured to identify which attributes of the media content items are requested to be returned to the content polling request. At 720, the method may include judging whether to participate in the mobile device polling event. For example, the mobile device may participate if the permissions set by the mobile device user enable the mobile device to return the requested polling data to the content polling module. At 722, if the answer is yes, the mobile device may participate in the mobile device polling event by transmitting the requested polling data to the content polling module. At 722, if the requested polling data is not permitted by the user preference, then the mobile device may not participate and may refrain from transmitting a content polling response that includes the requested polling data. In some embodiments, the mobile device may transmit a content polling response that indicates the attributes that were permitted to be polled by the mobile device user. From 722 or 724 the process flow may end or return for subsequent mobile device polling events.

FIG. 8 shows a schematic diagram of an example graphical user interface 800 of a user interface for managing mobile device polling. As a non-limiting example, graphical user interface 800 may correspond to graphical user interface 314 of user interface 312 of a mobile device. The mobile device may be configured to respond to content polling requests by transmitting content polling responses to the content polling module in accordance with the definitions or preferences indicated by the user of the mobile device and received via the user interface.

In some embodiments, graphical user interface 800 may include a participation preference definition tool 810 for enabling a mobile device user to define permissions by which media management module 316 of the mobile device responds to content polling requests. For example, tool 810 may include a global permission that enables the mobile device to transmit any polling data that is requested by the content polling module. Tool 810 may further include fields or graphical selectors that provide any suitable degree of granularity to the user. For example, the user may define permissions by the type or category of the media content items (e.g., audio, visual, textual, preferential) for which attributes are to be transmitted to the content polling module. As another example, the mobile device user may define permissions for commercially available content or user created content, thereby enabling the user to withhold polling data from the content polling module that relates to media content items that were created by the user. As another example, the mobile device user may permit only certain providers of the content polling module to obtain polling data from the mobile device. As yet another example, the mobile device user may select which attributes of the media content items may be transmitted to the content polling module.

In some embodiments, graphical user interface 800 may include authentication preferences 820 that enable a mobile device user to turn on or off the authentication process with content polling modules, as well as enter a username and/or passcode for establishing a trusted relationship with the content polling module.

Figure 9:
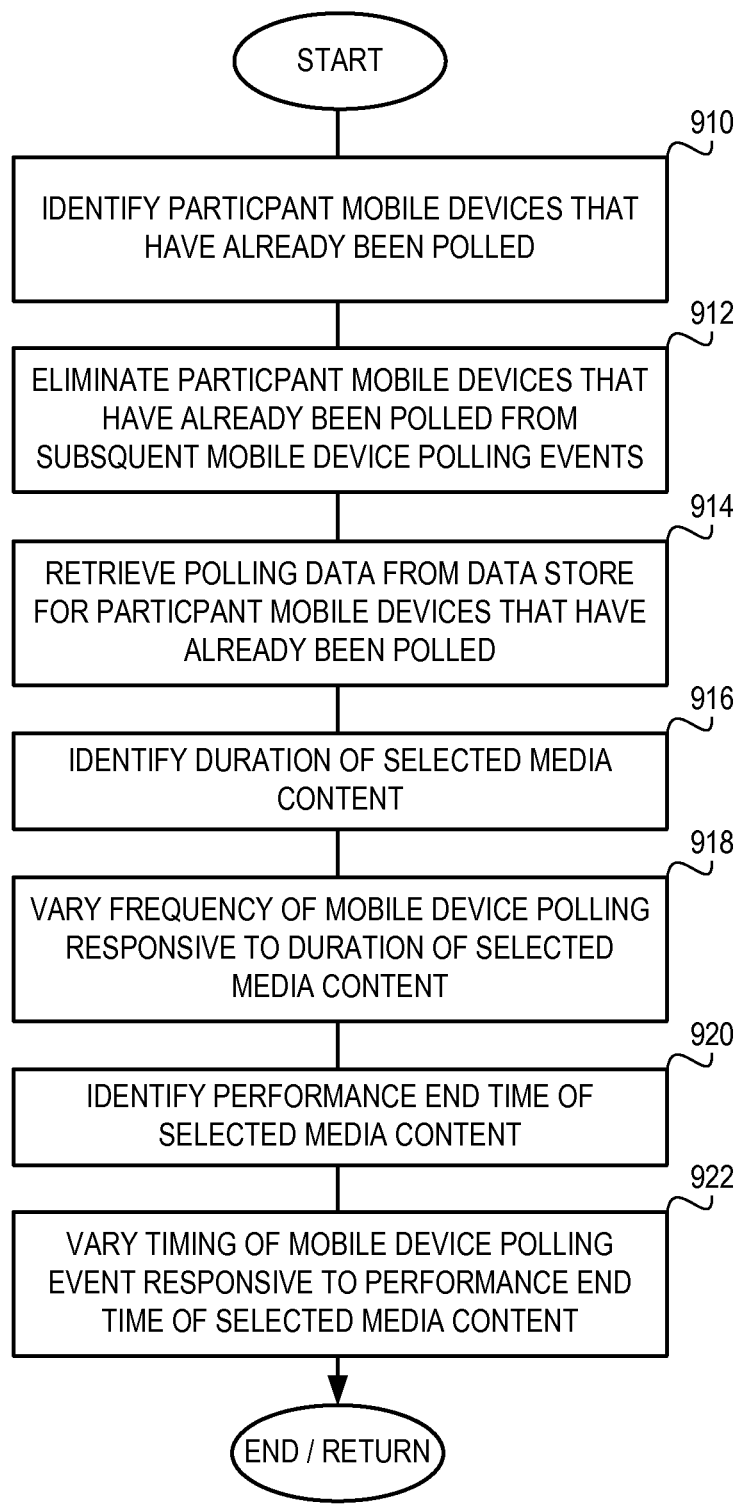
FIG. 9 is a flow chart depicting an example method of managing mobile device polling events in a content polling system.

FIG. 9 is a flow chart depicting a method of managing the timing and/or frequency of mobile device polling by a content polling module (e.g., content polling module 110 of FIG. 1). At 910, the method may include identifying participant mobile devices that have already been polled by the content polling module by previous mobile device polling events. For example, the content polling module may compare a roster of all participant mobile devices identified within the participation region to polling data that has been previously obtained (e.g., and stored in the data store) from some or all of the participant mobile devices. At 912, the method may include eliminating participant mobile devices that have already been polled from subsequent mobile device polling events. For example, the content polling module may poll participant mobile devices that have not yet been polled, while refraining from or reducing the frequency at which previously polled participant mobile devices are subsequently polled. At 914, the method may include retrieving polling data from the data store for participant mobile devices that have already been polled. For example, the content polling module may be configured to retrieve one or more attributes received via previous content polling responses.

At 916, the method may include identifying a duration of the selected media content that is currently being performed or is to be performed by the media player module. For example, the content polling module may be configured to identify a duration of the selected media content that is received from the content selection module. At 918, the method may include varying a frequency of mobile device polling responsive to the duration of the selected media content identified at 916. As a non-limiting example, the content polling module may be configured to adjust the frequency at which the participant mobile devices are polled based on or responsive to the length of time required to present or perform the selected media content. For example, if the selected media content is one or more songs that each have a duration of between 3 and 5 minutes, the content polling module may poll the participant mobile devices more frequently than if the selected media content is a movie that has a duration of 2 hours.

At 920, the method may include identifying a performance end time of the selected media content. For example, the content polling module may be configured to identify when the performance of the selected media content by the media player module is to end. In some embodiments, the media player module may be configured to transmit performance timing data to the content polling module to provide a notification of which selected media content is currently being performed and an end time of the performance of the selected media content. At 922, the method may include varying a timing of the mobile device polling event responsive to the performance end time of the selected media content. As a non-limiting example, the content polling module may be configured to poll the participant mobile devices at a prescribed time before the end of the performance of the selected media content. This prescribed time may be selected by the content polling module so that sufficient time is available to poll participant mobile devices, receive new selected media content from the content selection module, and forward the new selected media content to the media player application before the performance of the previously selected media content ends. In this way, mobile device polling may be performed later for selected media content whose performance is ending later than selected media content whose performance is ending earlier.

FIG. 10 depicts a non-limiting example of the polling data that may be provided by the content polling module to the content selection module via a content selection request. In example of FIG. 10, the mobile device polling event is indicated as number 33 and the participation region from which the polling data has been obtained is indicated as number 2 of 3. As previously described, the content polling module may used these indicators that accompany the content selection requests, content selection responses, and content performance requests to manage multiple successive mobile device polling events and direct the selected media content to the proper participation region.

Furthermore, in the example of FIG. 10, the polling data is aggregated with respect to authors of media content items having an audio content categorization. Each participant mobile device is depicted with the number of media content items of each author that are stored on or were previously accessed by that participant mobile device. Additionally, the number of each media content item by genre is included. Further still, volume data is represented for each participant mobile device indicating a maximum volume setting, a minimum volume setting, and one standard deviation range for the volume settings of that participant mobile device. It should be appreciated that the type of polling data and the organization of the polling data in FIG. 10 are provided merely as an example of how attributes of media content items may be provided to the content selection module by the content polling module.

Mobile device polling provides numerous benefits. As one example, a host of a social event may utilize the polling system to provide a DJ-ing function for guests. As guests enter and exit the participation region of the polling system, the media content that is performed for the guests may be adapted to the preferences of the guests as indicated by the participant mobile devices. Additionally, polling data that is obtained by mobile device polling may be used by the system administrator to configure the participation region. For example, retail establishments may use the polling data to select the products that are offered for sale, the layout of the products, advertising content, or the decorations of the retail establishment itself. Further still, the polling data may be sold to third parties for marketing or advertising purposes.

The invention claimed is:
1. A method comprising:
receiving a content polling message from a participant mobile device within a participation region of a wireless network;
retrieving, by a computing device, an attribute for the participant mobile device based upon the content polling message, the attribute associated with a media content item stored at the participant mobile device or previously accessed via the participant mobile device;
responsive to retrieving the attribute, storing the attribute in a memory device or electronically transmitting a content selection request that indicates the attribute to a content selection module;
obtaining a wireless signal strength measured at a wireless access point of a plurality of mobile devices;
determining whether each wireless signal strength is greater than a threshold wireless signal strength;
identifying a first mobile device of the plurality of mobile devices as a non-participant mobile device responsive to determining that the wireless signal strength of the first mobile device is not greater than the threshold wireless signal strength; and identifying a second mobile device of the plurality of mobile devices as the participant mobile device responsive to determining that the wireless signal strength of the second mobile device is greater than the threshold wireless signal strength.

2. The method of claim 1, wherein receiving the content polling message from the participant mobile device includes receiving the content polling message from the participant mobile device at the computing device over a wide area network between the wireless access point and the computing device.

3. The method of claim 2, further comprising:
selecting presentation media content responsive to or based on the attribute; and
transmitting the selected media content or an indication of the selected media content to a media player module over the wide area network for presentation of the selected media content, the media player module located at the computing device or the participant mobile device.

4. The method of claim 3, wherein the selected media content includes audio and/or video media content selected from a similar category, genre, or author of the media content item associated with the attribute, and wherein the selected media content is presented within the participation region.

5. The method of claim 1, further comprising:
comparing a geographic coordinate defining the participation region to a geographic location of the participant mobile device, the participant mobile device providing its geographic location over a wide area network.

6. The method of claim 1, further comprising:
receiving a user input via a graphical user interface defining the threshold wireless signal strength.

7. The method of claim 1, wherein the attribute is retrieved from a web service based upon an identifier included in the content polling message, the participant mobile device having previously registered contents of its media library with the web service.

8. The method of claim 1, further comprising:
storing a roster of a plurality of participant mobile devices in a data store; and
periodically updating the roster by removing a third mobile device from the roster in response to the third mobile device leaving the participation region and/or by adding a fourth mobile device to the roster in response to the forth mobile device entering the participation region.

9. The method of claim 8, further comprising:
varying a frequency of updating the roster responsive to duration of selected media content and/or end time of presented media content.

10. The method of claim 1, wherein the participation region of the wireless network is provided by the wireless access point and at least one additional wireless access point.

11. The method of claim 1, further comprising:
authenticating the participant mobile device based on a username and/or passcode supplied by a user of the participant mobile device prior to outputting an indication of the attribute.

12. The method of claim 1, further comprising:
selecting, by the content selection module, presentation media content responsive to the storage of the attribute in the memory device or the transmission of the content selection request;
wherein the selection is based on data taken from the content polling message; and
retrieving the selected presentation media content.

13. The method of claim 1, further comprising:
transmitting a content polling request to the participant mobile device, the content polling requests executable by the participant mobile device to return a content polling response;
wherein the received content polling message comprises the content polling response.

14. A computing system, comprising:
an electronic device configured to:
receive a content polling message from a participant mobile device within a participation region of a wireless network;
retrieve an attribute for the participant mobile device based upon the received content polling message, the attribute associated with a media content item stored at the participant mobile device or previously accessed via the participant mobile device;
output an indication of the attribute;
obtain a wireless signal strength measured at a wireless access point of a plurality of mobile devices;
determine whether each wireless signal strength is greater than a threshold wireless signal strength;
identify a first mobile device of the plurality of mobile devices as a non-participant mobile device responsive to determining that the wireless signal strength of the first mobile device is not greater than the threshold wireless signal strength; and
identify a second mobile device of the plurality of mobile devices as the participant mobile device responsive to determining that the wireless signal strength of the second mobile device is greater than the threshold wireless signal strength.

15. The computing system of claim 14, wherein the electronic device is further configured to receive the content polling message from the participant mobile device over a wide area network between the wireless access point and the electronic device.

16. The computing system of claim 15, wherein the electronic device is further configured to:
select presentation media content responsive to or based on the attribute; and
transmit the selected presentation media content or an indication of the selected presentation media content to another electronic device over the wide area network for presentation by a media player module residing at said another electronic device.

17. The computing system of claim 15, wherein the electronic device is further configured to authenticate the participant mobile device based on a username and/or passcode supplied by a user of the participant mobile device prior to selection of the presentation media content.

18. The computing system of claim 14, wherein the electronic device is further configured to transmit a content polling request to the participant mobile device, the content polling requests executable by the participant mobile device to return a content polling response;
wherein the received content polling message comprises the content polling response.

19. An apparatus, comprising:
means for retrieving an attribute for a participant mobile device within a participation region of a wireless network based upon a content polling message received from the participant mobile device, the attribute associated with a media content item stored at the participant mobile device or previously accessed via the participant mobile device;

means for outputting an indication of the attribute;

means for obtaining a wireless signal strength measured at a wireless access point of a plurality of mobile devices;

means for determining whether each wireless signal strength is greater than a threshold wireless signal strength;

means for identifying a first mobile device of the plurality of mobile devices as a non-participant mobile device responsive to determining that the wireless signal strength of the first mobile device is not greater than the threshold wireless signal strength; and means for identifying a second mobile device of the plurality of mobile devices as the participant mobile device responsive to determining that the wireless signal strength of the second mobile device is greater than the threshold wireless signal strength.

20. The apparatus of claim 19, further comprising:

means for selecting presentation media content responsive to or based on the attribute; and means for transmitting the selected presentation media content or an indication of the selected presentation media content over a network.

21. The apparatus of claim 19, further comprising:

means for transmitting a content polling request to the participant mobile device, the content polling requests executable by the participant mobile device to return a content polling response;

wherein the received content polling message comprises the content polling response.

\* \* \* \* \*